United States Patent
Brückner et al.

(10) Patent No.: US 12,496,226 B2
(45) Date of Patent: Dec. 16, 2025

(54) EYE-SURGICAL TREATMENT APPARATUS

(71) Applicant: Carl Zeiss Meditec AG, Jena (DE)

(72) Inventors: Frank Brückner, Jena (DE); Wolf Weimer, Jena (DE); Andreas Weyhausen, Jena (DE); Ralf Labouvie, Jena (DE); Gregor Stobrawa, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 718 days.

(21) Appl. No.: 17/640,924

(22) PCT Filed: Sep. 8, 2020

(86) PCT No.: PCT/EP2020/075058
§ 371 (c)(1),
(2) Date: Sep. 13, 2022

(87) PCT Pub. No.: WO2021/048115
PCT Pub. Date: Mar. 18, 2021

(65) Prior Publication Data
US 2022/0409433 A1    Dec. 29, 2022

(30) Foreign Application Priority Data
Sep. 10, 2019  (DE) .................. 10 2019 213 736.9

(51) Int. Cl.
*A61F 9/00*   (2006.01)
*A61F 9/008*  (2006.01)

(52) U.S. Cl.
CPC ...... *A61F 9/00827* (2013.01); *A61F 9/00836* (2013.01); *A61F 2009/00872* (2013.01);
(Continued)

(58) Field of Classification Search
None
See application file for complete search history.

(56) References Cited

U.S. PATENT DOCUMENTS 6,159,205 A * 12/2000 Herekar .............. A61F 9/00821
606/4
7,237,898 B1 * 7/2007 Hohla .................... G06V 40/18
606/5

(Continued)

FOREIGN PATENT DOCUMENTS

DE         69500997 T2      4/1998
DE    10 2005 40338 A1      3/2007
(Continued)

OTHER PUBLICATIONS

International Search Report for PCT/EP2020/075058, mailed Nov. 30, 2020, 5 pages.

(Continued)

*Primary Examiner* — Niketa Patel
*Assistant Examiner* — Anant A Gupta
(74) *Attorney, Agent, or Firm* — DeWitt LLP (57) ABSTRACT

A planning device for generating control data for a treatment apparatus which produces at least one cut surface in the cornea by operation of a laser device, and to a treatment apparatus including a planning device of the specified type. Also, a method for generating control data for such a treatment apparatus, and a method of eye surgery. In this case, a rotation of the cut surface about an axis running substantially parallel to the ocular axis is facilitated during the determination of the cut surfaces.

18 Claims, 6 Drawing Sheets

(52) U.S. Cl.
CPC ............... *A61F 2009/00878* (2013.01); *A61F 2009/00897* (2013.01)

(56) References Cited

U.S. PATENT DOCUMENTS

| | | | |
|---|---|---|---|
| 2014/0081249 A1* | 3/2014 | Bischoff | A61F 9/00834 606/5 |
| 2014/0128857 A1* | 5/2014 | Wottke | A61F 9/013 606/5 |
| 2018/0008461 A1 | 1/2018 | Fu et al. | |

FOREIGN PATENT DOCUMENTS

| | | | | |
|---|---|---|---|---|
| DE | 10 2007 019813 A1 | | 10/2008 | |
| DE | 102012014769 A1 | * | 1/2013 | ............. A61F 9/009 |
| WO | WO 2014172621 A2 | | 10/2014 | |
| WO | WO-2015195940 A1 | * | 12/2015 | ............... A61B 3/12 |
| WO | WO 2016050779 A1 | | 4/2016 | |

OTHER PUBLICATIONS

English translation of International Search Report for PCT/EP2020/075058, mailed Nov. 30, 2020, 3 pages.

\* cited by examiner

EYE-SURGICAL TREATMENT APPARATUS

RELATED APPLICATIONS

This application is a National Phase entry of PCT Application No. PCT/EP2020/075058 filed Sep. 8, 2020, which application claims the benefit of priority to DE Application No. 10 2019 213 98.2 filed Sep. 10, 2019, and DE Application No. 10 2019 213 736.9, filed Sep. 10, 2019, the entire disclosures of which are incorporated herein by reference.

TECHNICAL FIELD

The invention relates to a planning device for generating control data for a treatment apparatus which produces at least one cut surface in the cornea by application of a laser device.

The invention further relates to a treatment apparatus having a planning device of the aforementioned type.

The invention also relates to a method for generating control data for a treatment apparatus which produces at least one cut surface in the cornea by application of a laser device.

The invention finally likewise relates to a method for eye surgery, at least one cut surface being produced in the cornea by application of a treatment apparatus with a laser device. The invention furthermore relates to a user interface for an aforementioned planning device.

BACKGROUND

The prior art has disclosed very different treatment methods for correcting the refraction of the human eye. Here, the surgical methods modify the cornea in a targeted fashion in order thus to influence the refraction of light in the eye. A number of surgical methods are used to this end. The most widespread method is what is known as laser in-situ keratomileusis, which is also abbreviated LASIK. In the process, a corneal lamella is detached from the corneal surface on one side and folded to the side. This lamella can be detached by use of a mechanical microkeratome, or else by use of what is known as a femtosecond laser keratome, as distributed by Intralase Corp., Irvine, USA, for example. Once the lamella has been detached and folded to one side, the application of an excimer laser is provided in the LASIK operation, said laser removing the corneal tissue, exposed under the lamella in this way, by ablation. Once corneal tissue that was originally located under the corneal surface has been vaporized from the surface in this way, the corneal lamella is folded back onto its original place again.

The application of a laser keratome for exposing the lamella is advantageous over a mechanical blade since the geometric precision is improved and the frequency of clinically relevant complications is reduced. In particular, the lamella can be produced with a much more constant thickness if laser radiation is used. Additionally, the cut edge is shaped precisely, reducing the risk of healing disorders as a result of this interface which remains even after the operation. However, a disadvantage of this method is that two different treatment apparatuses have to be used, specifically firstly the laser keratome for exposing the lamella and, secondly, the laser that vaporizes the corneal tissue.

These disadvantages have been overcome in a method that was implemented by Carl Zeiss Meditec AG and that is known by the abbreviated name FLEX (Femtosecond Lenticule EXtraction). In this method for lenticule extraction, a cut geometry which separates a corneal volume (a so-called lenticule) in the cornea is formed in the cornea of the eye by application of a short pulse laser, for example a femtosecond laser. Said lenticule is then manually removed by the surgeon after the lamella (flap) that covers the lenticule has been folded to the side. The advantage of this method lies firstly in the fact that the cut quality is improved even further by the application of the femtosecond laser in combination with a curved contact glass.

Secondly, this only still requires one treatment apparatus; the excimer laser is no longer used. This method also avoids risks and limitations of the excimer laser.

A development of the FLEx method is currently referred to as SMILE method in the literature; no flap is produced here but only a small opening cut which serves to provide access to the lenticule which is located under what is known as the cap. The separated lenticule is removed through this small opening cut, as a result of which the biomechanical integrity of the anterior cornea is impaired less than in the case of LASIK or similar methods. Moreover, fewer surface nerve fibers in the cornea are cut in this way, which probably has an advantageous effect on the reestablishment of the original sensitivity of the corneal surface. As a result, the symptom of dry eyes, which frequently has to be treated after LASIK, is reduced in its severity and duration. Other complications following LASIK, which are usually connected to the flap (e.g., flap displacement, folds, ingrowing epithelium in the flap bed), also occur less frequently without flap.

When generating cut surfaces in the cornea by application of laser radiation, the optical radiation effect is usually exploited by virtue of optical breakdown being generated by individual optical pulses, the duration of which may be between approximately 100 fs and 100 ns. It is also known to introduce individual pulses that have an energy below a threshold for optical breakdown into the tissue or material in such overlaid fashion that material or tissue separation is also achieved therewith. This concept of producing cuts in the corneal tissue facilitates a great variety of cuts.

What is common to all these known methods is that the success of the treatment depends on the reliable assignment of the intended cut or intended cuts to the geometry of the eye to be treated since even small deviations from the envisaged refraction correction may lead to a non-optimal correction and hence to an induced visual defect.

However, within the scope of methods building on the production of cuts in the cornea, for example refractive SMILE, LASIK, PRK (photorefractive keratectomy) or therapeutic: ICR (intrastromal corneal ring), keratoplasty, other intrastromal pockets, etc., there may be angle deviations between the ocular coordinate system of the patient and the coordinate system of the treatment apparatus in which the cuts are defined.

Typical causes for these deviations include:
- cyclotorsion: rotation between upright and lying patient position,
- rotation of the eye when suctioning onto a contact glass of the treatment device,
- oblique position/head alignment of the patient in relation to the device,
- mechanical tolerances in the device (e.g., angle tolerance in the adjustment between cut system and the camera used to visualize angles of rotation; other optics tolerances).

If disregarded, these deviations lead to none of the rotationally symmetric components of the cuts to be implemented being applied at the planned location, which may have an influence on the clinical result of the treatment. These include:

incorrectly corrected cylinder axis,
incorrectly positioned access cuts such as hinges in flap, incisions (opening cuts) in SMILE, access cuts in ICR, tunnels in pockets,
incorrectly corrected non-rotationally symmetric higher-order components.

The prior art has only disclosed the rotation of the contact glass on the basis of a manual comparison of the therapy image before the treatment with data recorded during the preliminary examination. This method is inaccurate and provides no quantitative feedback to the physician about the angle of rotation that has been adapted by them. Furthermore, the eye is deflected from its rest state, inducing a restoring force. This may lead to an elevated suction loss risk (loss of suction of the contact glass on the eye) and is perceived as uncomfortable by the patient.

SUMMARY OF THE INVENTION

Embodiments of the invention is specify a planning device for generating control data, a treatment apparatus for refraction-correcting eye surgery, and a method for generating control data for such a treatment apparatus, which facilitate an improved correction of the refraction.

According to the invention, this object is achieved by a planning device of the type set forth at the outset, the latter comprising a calculation application for defining the corneal cut surfaces, which, during the determination of the cut surfaces, facilitates a rotation of the cut surface about an axis running substantially parallel to the ocular axis.

Thus, the physician can carry out an optimal placement of the cuts in the cornea according to their experience, in particular compensate a rotation of the eye of the patient when adopting the treatment position.

Embodiments of the invention further include a treatment apparatus comprising a laser device which separates at least one cut surface in the cornea by application of laser radiation according to the control data, and a planning device of the just aforementioned type for generating the control data, wherein the planning device, during the determination of the cut surfaces, facilitates a rotation of the cut surface about an axis running substantially parallel to the ocular axis.

Example embodiments of the invention include a method for generating control data of the type set forth at the outset, the method including: generating a control data record for the corneal cut surfaces for controlling the laser device, wherein the planning device, during the determination of the cut surfaces, facilitates a rotation of the cut surface about an axis running substantially parallel to the ocular axis.

Another example embodiment of the invention includes a method comprising: generating a control data record for the corneal cut surfaces, transferring the control data to the treatment apparatus and producing the cut surfaces by controlling the laser device using the control data record, wherein, during the generation of the control data record, the determination of the cut surfaces facilitates a rotation of the cut surface about an axis running substantially parallel to the ocular axis.

A further example embodiment of the invention is a user interface which provides an input application, with the aid of which the final determination of the cut surfaces facilitates a rotation of the cut surface about an axis running substantially parallel to the ocular axis.

The invention therefore relates to an apparatus and a method which improves refractive surgery by virtue of the physician, according to their experience, being able to carry out optimal placement of cuts, for example in the cornea.

The tissue to be treated is or example the cornea or the lens of the eye, but this may also relate to the vitreous humor or other structures in the eye.

The solution according to the invention offers the option of a complete rotation of the cut pattern, to be applied, as the basis for the cuts in the eye tissue by the addition of an angle offset to all coordinates of the cut pattern.

The physician is provided with the option of defining this angle immediately before surgery. This is either implemented manually by the physician or on the basis of an algorithm which determines and proposes an angular deviation from a diagnostic image and therapy image. Subsequently the physician can finely adjust this angle.

The rotation angle thus chosen at this instant can for example be visualized and quantified by way of a therapy co-observation.

It is advantageous, for example, if a further angle that was determined during the adjustment of the device can be added to this angle offset in order to compensate rotational errors on account of mechanical tolerances.

Hence, a rotation of the cut pattern can be visualized both during the planning and immediately before the start of the laser treatment, and can be altered by the physician.

In this case, the course of events according to the invention can be as follows:

recording an image of the patient's eye in the diagnostic device,
identifying an anatomical feature,
planning the intended angular position of the cut pattern in relation to the anatomical feature of the patient's eye,
recording an image of the patient's eye in the treatment apparatus,
identifying the anatomical feature,
displaying information about the deviation between the intended angular position and the currently set angular position,
fitting the intended cut pattern to the actual position of the eye by rotating the cut pattern or its target coordinates.

The iris or its patient-specific structure for example serves as anatomical feature. Alternatively, it is also possible to resort to another angle-dependent feature, for example the retina. Likewise, an artificial mark on the cornea or the sclera by use of a colored spot or the like is possible.

For example, the deviation can be represented in numerical or graphical form.

It is particularly advantageous in an example embodiment for the rotation angle to be set immediately before the treatment and after the fixation of the patient's eye by use of the contact glass.

The adjustable angular range may be restricted, for example to +/−20°.

Further for example, there is a lower bound for the increment of the angle adjustment, for example 1°.

For example, the time interval between changing the setting of the rotation angle and establishing treatment readiness or the start of the treatment is less than 3 seconds, in another example less than 1 second.

For example, the rotation angle is adjusted by way of a visualization by use of a data overlay in the therapy observation.

Likewise for example, an adjustment scale for the rotation is visualized by way of a data overlay in the therapy observation.

For example, the adjustment option for the rotation angle is combined with an available operating element, in particular with an operating element which the operator uses to correctly position the patient's eye relative to the device or to correctly position the device relative to the patient's eye. By way of example, this could be a joystick, or else a computer mouse or rotary encoder.

Further for example, the difference between the proposed angle and the currently set angle is visualized and/or quantified.

For example, the difference between the proposed angle and the currently set angle is assessed in relation to an adjustable limit.

In this case, it is also possible to assess the difference between a plurality of proposed angles and the currently set angle.

For example, the angle used during the treatment is stored together with the proposed angle and the treatment data following the treatment.

It is understood that the features mentioned above and the features still to be explained below can be used not only in the specified combinations but also in other combinations or on their own without departing from the scope of the present invention.

BRIEF DESCRIPTION OF THE DRAWINGS

The invention is explained in even greater detail below for example with reference to the accompanying drawings, which also disclose features essential to the invention. In the figures.

DETAILED DESCRIPTION

Figure 1:
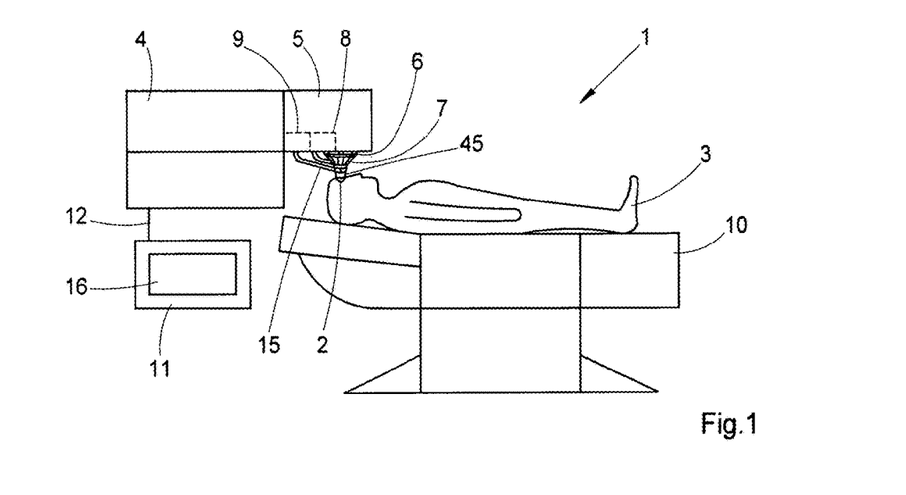
FIG. 1 is a schematic illustration of a treatment apparatus with a planning device for a treatment within the scope of an eye-surgical refraction correction.

A treatment apparatus for eye surgery is illustrated in the FIG. 1 and provided with the general reference sign 1. The treatment apparatus 1 is designed to introduce laser cuts on an eye 2 of a patient 3. To this end, the treatment apparatus 1 comprises a laser device 4 which emits a laser beam 6 from a laser source 5, the laser beam being directed into the eye 2 or the cornea of the eye as a focused beam 7. For example, the laser beam 6 is a pulsed laser beam with a wavelength between 300 nanometers and 10 micrometers. Further, the pulse length of the laser beam 6 is in the range between 1 femtosecond and 100 nanoseconds, with pulse repetition rates of 500 kilohertz and 30 MHz, for example 1.2 to 10 MHz, and pulse energies between 1 nanojoule and 10 microjoules, for example 1 to 200 nanojoules being possible. The treatment apparatus 1 therefore generates a cut surface in the cornea of the eye 2 by deflecting the pulsed laser radiation. Therefore, a scanner 8 and a radiation intensity modulator 9 are additionally provided to this end in the laser device 4 or the laser source 5 thereof.

The patient 3 is situated on a bed 10, which is optionally adjustable in three spatial directions in order to suitably align the eye 2 in relation to the incidence of the laser beam 6. In an example construction, the bed 10 is adjustable in motor-driven fashion. Alternatively, the patient bed is less movable and the treatment apparatus is appropriately adjustable by motor in return.

In particular, the control can be implemented by a controller 11 which, in principle, controls the operation of the treatment apparatus 1 and, to this end, is connected to the treatment apparatus by way of suitable data links, for example connection lines 12. Naturally, this communication can also be implemented in different ways, for example via light guides or by radio. The controller 11 makes the appropriate adjustments to and controls the timing of the treatment apparatus 1, in particular the laser device 4, and hence brings about appropriate functions of the treatment apparatus 1.

The treatment apparatus 1 furthermore has a fixation device 15, which fixates the relative position of the cornea of the eye 2 with respect to the laser device 4. This fixation device 15 may comprise a known contact glass 45 in the process, to which the cornea of the eye is applied by negative pressure and which imparts a desired geometric shape on the cornea of the eye. Such contact glasses are known to a person skilled in the art from the prior art, for example from DE 102005040338 A1. The disclosure of this document, to the extent this relates to the description of a structure of the contact glass 45 that is suitable for the treatment apparatus 1, is completely incorporated herein.

Other modified or improved contact glass forms may also have advantages for the invention and are therefore intended to be incorporated.

The treatment apparatus 1 furthermore comprises a camera (not illustrated here), which is configured to record an image of the cornea 17 of the eye through the contact glass 45. In this case, the lighting for the camera may be implemented both in the visible and in the infrared range of the light.

The controller 11 of the treatment apparatus 1 further comprises a planning device 16, which will still be explained in more detail below.

Figure 2:
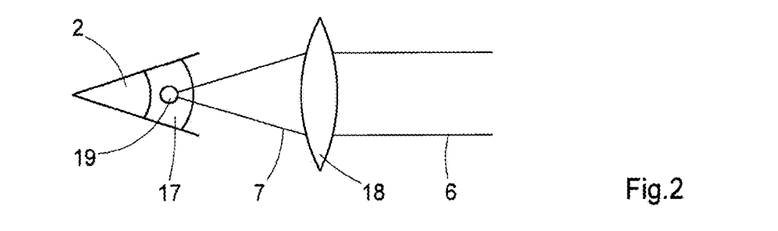
FIG. 2 is a schematic illustration of the effect of the laser radiation which is used in the treatment apparatus of FIG. 1.

FIG. 2 schematically shows the effect of the incident laser beam 6. The laser beam 6 is focused and is incident into the cornea 17 of the eye 2 as the focused laser beam 7. Schematically plotted optics 18 are provided for focusing purposes. They bring about a focus in the cornea 17, the laser radiation energy density being so high in said focus that, in combination with the pulse length of the pulsed laser radiation 6, a nonlinear effect occurs in the cornea 17. By way of example, each pulse of the pulsed laser radiation 6 can produce an optical breakdown in the cornea 17 of the eye in the focus 19, said breakdown, in turn, initiating a plasma bubble as indicated only schematically in FIG. 2. When the plasma bubble arises, the tissue layer separation comprises an area larger than the focus 19, even though the conditions for producing the optical breakdown are only obtained in the focus 19. So that an optical breakdown is produced by each laser pulse, the energy density, i.e., the fluence of the laser radiation, must lie above a certain, pulse-length-dependent threshold. A person skilled in the art is aware of this relationship, for example from DE 69500997 T2. Alternatively, a tissue-separating effect can also be achieved by pulsed laser radiation by virtue of a plurality of laser radiation pulses being emitted into a region, with the focal spots overlapping. Then, a plurality of laser radiation pulses interact in order to obtain a tissue-separating effect. The type of tissue separation used for the treatment apparatus 1 is of no further relevance to the description below, however; all that is essential is that a cut surface is produced in the cornea 17 of the eye 2.

In order to correct the refraction by eye surgery, a corneal volume is removed from a region within the cornea 17 by application of the laser radiation 6 by virtue of tissue layers being separated there, said tissue layers isolating the corneal volume and then facilitating the removal thereof. To isolate the corneal volume to be removed, the position of the focus 17 of the focused laser radiation 7 in the cornea 17 is adjusted, e.g., in the case of the laser radiation introduced in pulsed form. This is shown schematically in FIG. 3. The refractive properties of the cornea 17 are modified in a targeted fashion by the removal of the volume in order thus to attain the correction of the refraction. Therefore, the volume is usually lens-shaped and is referred to as a lenticule.

Figure 3:
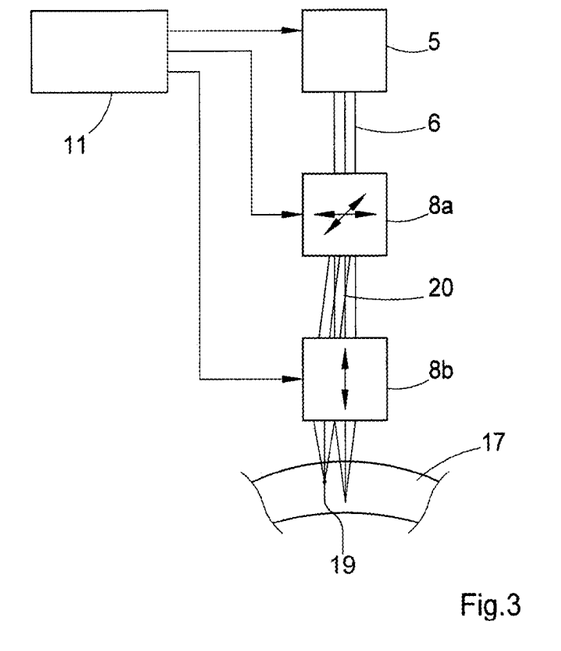
FIG. 3 is a further schematic illustration of the treatment device of FIG. 1, in relation to the introduction of the laser radiation.

FIG. 3 only plots the elements of the treatment apparatus 1 to the extent that these are necessary for understanding the cut surface production. As already mentioned, the laser beam 6 is focused at a focus 19 in the cornea 17 and the position of the focus 19 in the cornea is adjusted such that, for the purposes of producing cut surfaces, energy of laser radiation pulses, focused at different positions, is introduced into the tissue of the cornea 17. The laser radiation 6 is provided, for example as pulsed radiation, by the laser source 5. In the structure of FIG. 3, the scanner 8 has a two-part construction and consists of an xy-scanner 8a, which is realized in one variant by two galvanometer mirrors that deflect substantially orthogonally. The scanner 8a two-dimensionally deflects the laser beam 6 coming from the laser source 5 such that a deflected laser beam 20 is present downstream of the scanner 9. Consequently, the scanner 8a brings about an adjustment of the position of the focus 19 substantially perpendicular to the principal direction of incidence of the laser beam 6 in the cornea 17. In addition to the xy-scanner 8a, a z-scanner 8b is additionally provided in the scanner 8 for adjusting the depth position, said z-scanner being embodied as an adjustable telescope, for example. The z-scanner 8b ensures that the z-position of the position of the focus 19, i.e., the position thereof on the optical axis of incidence, is modified. The z-scanner 8b can be disposed upstream or downstream of the xy-scanner 8a.

For the principle of operation of the treatment apparatus 1, the assignment of the individual coordinates to the spatial directions is not essential, just as it is not essential that the scanner 8a deflects about mutually orthogonal axes. Rather, it is possible to use any scanner that is able to adjust the focus 19 in a plane not containing the axis of incidence of the optical radiation. Further, it is also possible to use any non-Cartesian coordinate system for the purposes of deflecting or controlling the position of the focus 19. Examples include spherical coordinates or cylindrical coordinates.

The position of the focus 19 is controlled by use of the scanners 8a, 8b which are controlled by the controller 11, the latter making appropriate adjustments to the laser source 5, the modulator 9 (which is not shown in FIG. 3) and the scanner 8. The controller 11 ensures a suitable operation of the laser source 5 and the three-dimensional focus adjustment, explained here in exemplary fashion, such that ultimately a cut surface is formed, the latter isolating a certain corneal volume that is intended to be removed for correcting the refraction.

The controller 11 operates according to predetermined control data which, for example in the case of the laser device 4 explained here merely in exemplary fashion, are specified as target points for the focus adjustment. As a rule, the control data are combined in a control data record. This yields geometric specifications for the cut surface to be formed, for example the coordinates of the target points as a pattern. Then, in this embodiment, the control data record also contains specific outputs for the focal position adjustment mechanism, for example for the scanner 8.

Figure 4:
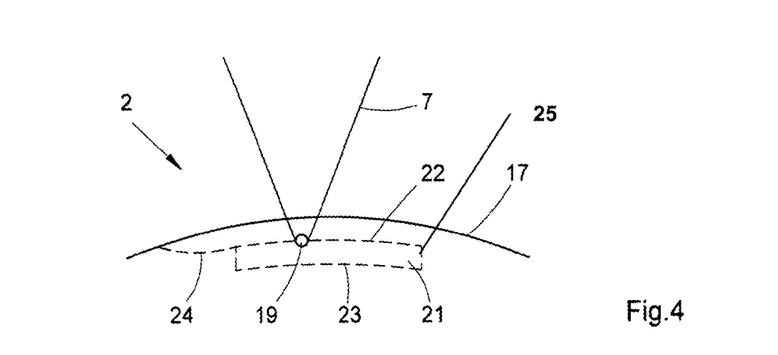
FIG. 4 is a schematic sectional illustration through the cornea of the eye for elucidating the removal of the corneal volume in the context of the eye-surgical refraction correction.

The production of the cut surface using the treatment apparatus 1 is shown in FIG. 4 in exemplary fashion. A corneal volume 21 in the cornea 17 is isolated by repositioning the focus 19, at which the focused beam 7 is focused. To this end, cut surfaces are formed, which are formed here as an anterior flap cut surface 22 and as a posterior lenticule cut surface 23 in exemplary fashion. These terms should be considered purely exemplary here and are intended to establish the relationship to the conventional LASIK or flex method, for the implementation of which the treatment apparatus 1 is likewise designed, as already explained above. All that is essential here is that the cut surfaces 22 and 23 and the peripheral edge cut 25, which brings together the cut surfaces 22 and 23 at their edges, isolate the corneal volume 21. Further, a corneal lamella bounding the corneal volume 21 on the anterior side can be folded open by way of an opening cut 24 such that the corneal volume 21 is removable.

Alternatively, and essential to the present invention, it is possible to use the SMILE method, within the scope of which the corneal volume 21 is removed through a small opening cut as described in DE 10 2007 019813 A1. The disclosure of this document is incorporated here in its entirety.

Figure 5:
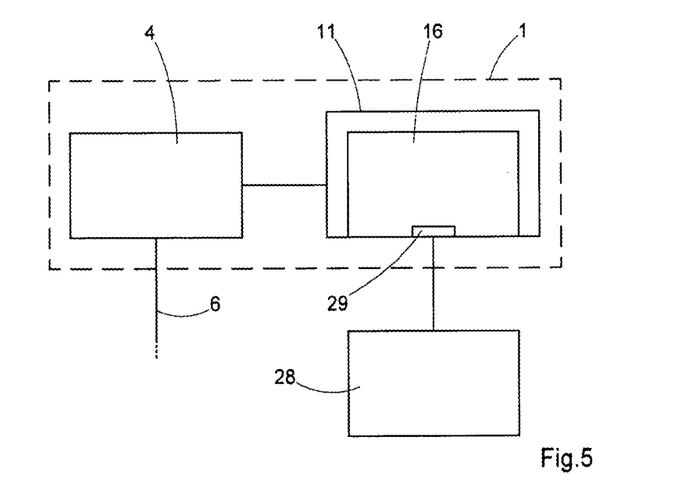
FIG. 5 is a schematic illustration in respect of the design of the treatment device of FIG. 1 with particular reference to the planning device present there.

FIG. 5 schematically shows the treatment apparatus 1, and the importance of the planning device 16 should be explained in more detail on the basis thereof. In this variant, the treatment apparatus 1 comprises at least two devices or modules. The laser device 4, already explained above, emits the laser beam 6 onto the eye 2. As already explained, the operation of the laser device 4 is implemented fully automatically by way of the controller 11; that is to say, following an appropriate start signal, the laser device 4 starts the generation and deflection of the laser beam 6 and produces cut surfaces constructed as described above in the process. The laser device 5 receives the control signals required for the operation from the controller 11, which was provided with appropriate control data at an earlier time. This is implemented by operation of the planning device 16, which is shown purely in exemplary fashion as a constituent part of the controller 11 in FIG. 5. Naturally, the planning device 16 can also have an independent embodiment and communicate with the controller 11 in wired or wireless fashion. All that is essential in that case is that an appropriate data transfer channel is provided between the planning device 16 and the controller 11.

The planning device 16 generates a control data record which is made available to the controller 11 for the purposes of carrying out the eye-surgical refraction correction. In this case, the planning device uses measurement data about the cornea of the eye. In the embodiment described here, these data originate from a measuring device 28 which had previously measured the eye 2 of the patient 2. Naturally, the measuring device 28 can be designed in any suitable way and transmit the corresponding data to the interface 29 of the planning device 16.

The planning device 16 now supports the operator of the treatment apparatus 1 when defining the cut surface for isolating the corneal volume 21. This can go as far as fully automatically defining the cut surfaces, which may be implemented by way of the planning device 16 determining, from the measurement data, the corneal volume 21 to be removed, defining the boundaries of said corneal volume as cut surfaces and generating appropriate control data for the controller 11 therefrom. At the other end of the degree of automation, the planning device 16 may provide input options, at which a user enters the cut surfaces in the form of geometric parameters, etc. Intermediate levels provide suggestions for the cut surfaces that are generated automatically by the planning device 16 and then are modifiable by a user. In principle, all the concepts already explained above in the more general part of the description may be applied here in the planning device 16.

To carry out the treatment, the planning device 16 generates control data for producing the cut surfaces, the control data then being used in the treatment apparatus 1.

Figure 6:
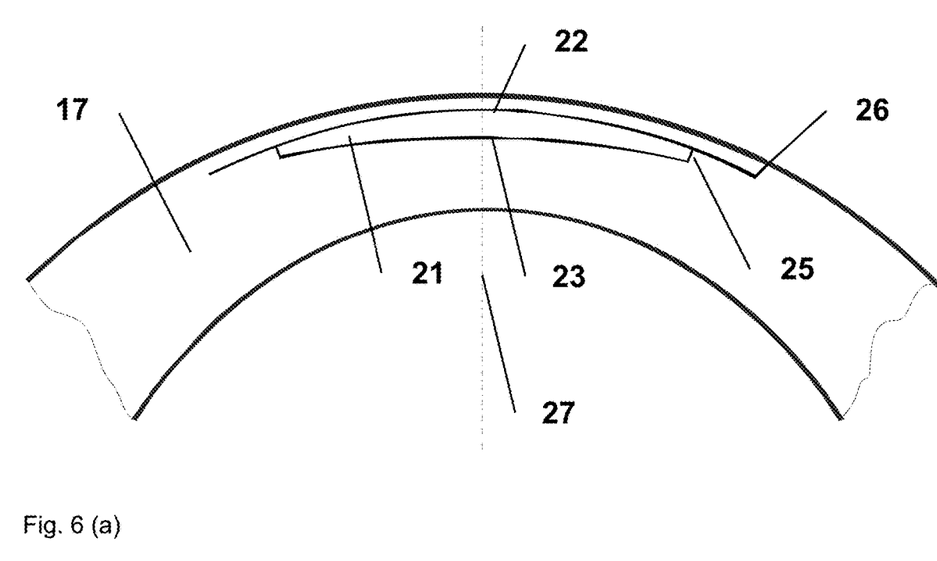
FIG. 6 is a schematic illustration of a cut geometry using the example of a SMILE procedure.

For clarification purposes, FIG. 6a shows a schematic illustration of a corneal cross section during the SMILE method. The cornea 17 has an anterior cap cut 22 with an opening cut 26. The posterior lenticule cut 23 isolates the lenticule volume 21 which can then be removed through the opening cut 26. To this end, the lenticule 21 needs to initially be completely separated, by virtue of a spatula-type instrument mechanically separating tissue bridges for instance that remain in the cap cut 22 and lenticule cut 23. Subsequently, the lenticule 21 is removed through the opening cut 26. The (imaginary) axis 27 represents the axis of symmetry of the cuts 22, 23, its point of intersection on the surface of the cornea 17 defining the centration of the cuts 22, 23, 25, 26.

FIG. 6b is a plan view of the cornea illustrated in FIG. 6a, the meaning of the reference signs corresponding to that of FIG. 6a.

Figure 7:
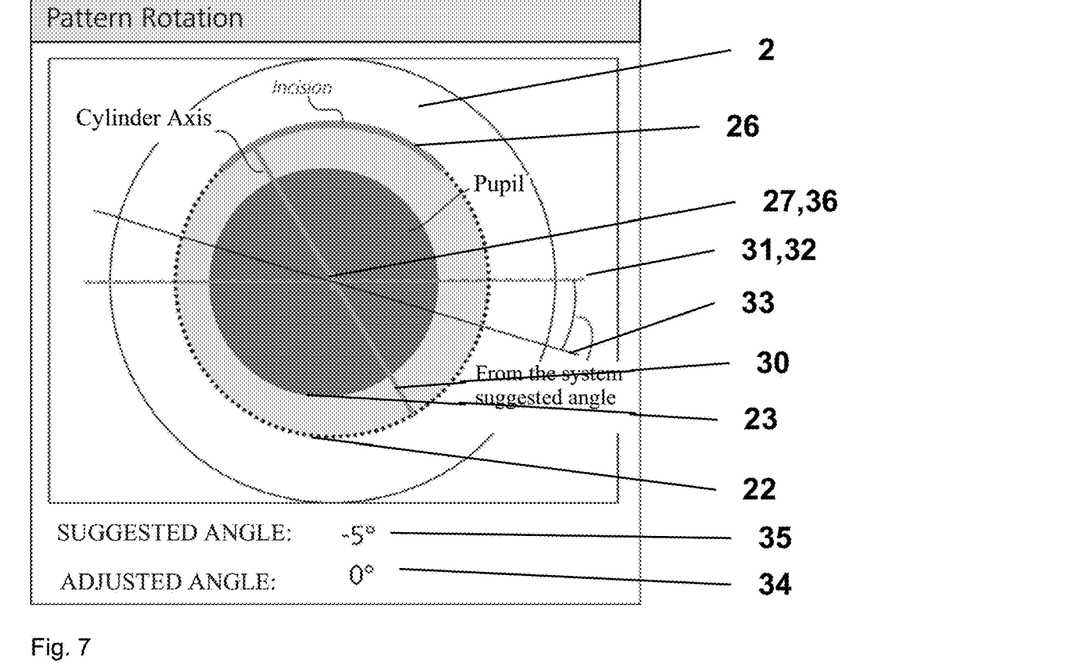
FIG. 7 is a schematic illustration of a screen of the planning device.

FIG. 7 schematically depicts a user interface of the planning device 16 according to the invention. The flap (or cap) cut 22 and the lenticule cut 23 and the opening cut 26 are illustrated in a plan view in a schematic image representation of the patient's eye 2. Moreover, the cylinder axis 30 arising from the diagnosis is indicated. By way of example, one or more of the group of keratometer system, wavefront analysis system, optical coherence tomography system, Placido disk-based topography system, Scheimpflug topography system, confocal topography system, low-coherence topography system, etc. come into question as a diagnostic device. For the spatial assignment of the cylinder axis 30 to the anatomy of the eye, an image of anatomical features of the eye suitable for the angle assignment (e.g., iris, retina), which image was created for diagnostic purposes, is displayed (omitted in the figure for the sake of clarity) to the physician/surgeon. During planning, the system assumes a reference angle of 0°, which is plotted here as line 31 (and which coincides with the angle 32 set in this case). From the diagnostic data, the planning device calculates a proposal, plotted here as line 33, on the basis of appropriate algorithms. Both angles are also displayed numerically on appropriate displays 34, 35. This change (rotation) of the cut patterns is implemented about an axis 36, which may for example be the visual axis of the eye 2 or the device axis of the treatment apparatus 1. It may also coincide with axis of symmetry 27 from FIG. 6a. The physician can already make a change in relation to the proposal of the planning device 16 at this stage.

In this case, the rotation change can be input for example numerically, by a computer mouse in the representation of the eye or by use of slide controls not illustrated here. After the confirmation by the physician, the control data for the cuts into the cornea are calculated accordingly and transferred to the controller 11.

Figure 8:
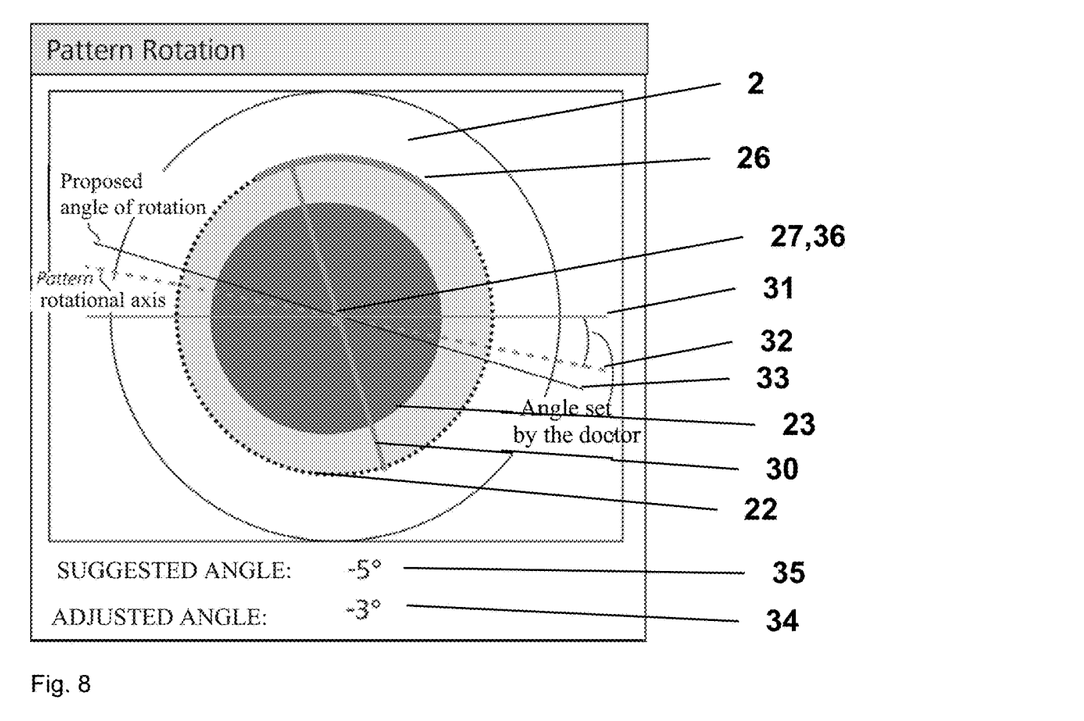
FIG. 8 is a schematic illustration of a screen of the treatment apparatus.

FIG. 8 schematically shows a user interface for setting the rotation of the cut patterns immediately before the treatment. The patient has been positioned on the bed 10 and is in the lying position envisaged for the operation. In this case, the camera image recorded through the contact glass 45 and the anatomical features used as orientation within the scope of the planning are graphically overlaid (not illustrated in detail here). Moreover, the rotation angle 33 defined within the scope of the planning is illustrated. By comparing the anatomical features used during planning with the currently available image taken by the camera through the contact glass 45 suctioned on the eye 2, the physician can verify whether the orientation of the eye 2 on which the planning is based has been maintained during the fixation of the eye 2. They can correct this by way of an appropriate adjustment (line 37). It is also possible to undertake further relatively small corrections on the basis of their experience. When said physician confirms the rotation set by them, the cut patterns underlying the cuts 22, 23 and 26 are recalculated accordingly and, following a go-ahead, the operation is started.

Figure 9A:
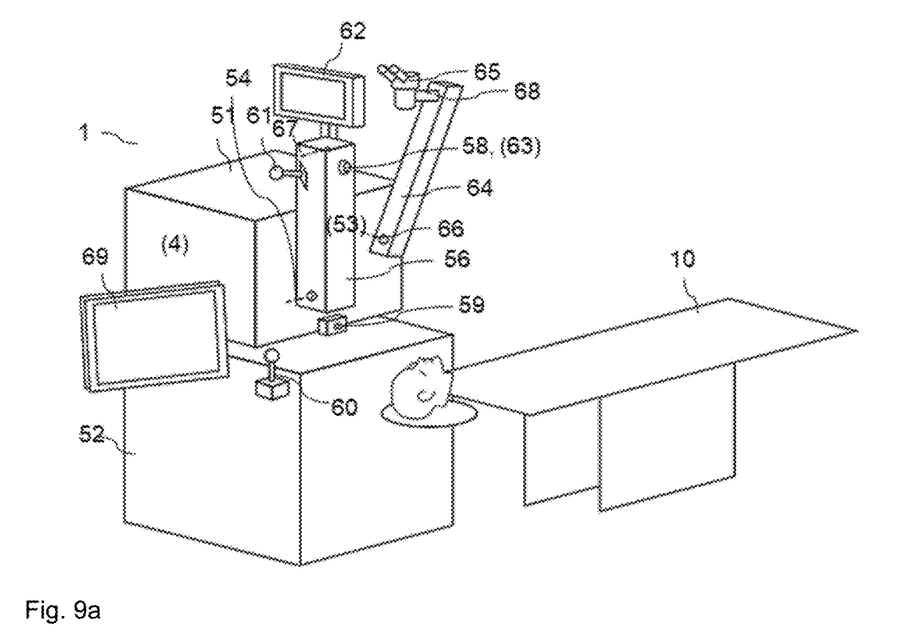
FIG. 9a-c depict an example embodiment of the treatment apparatus.
Figure 9B:
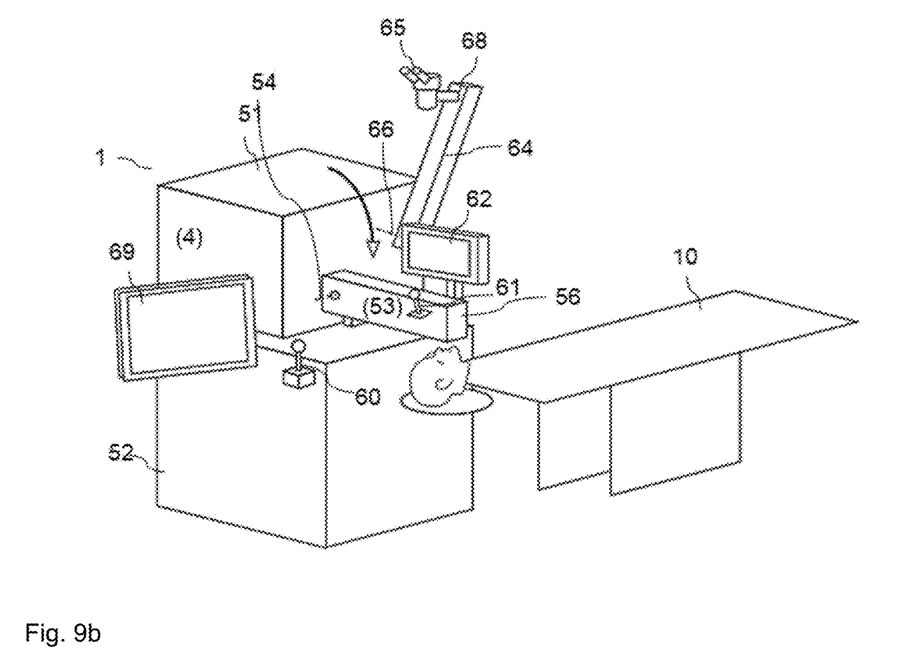
Figure 9C:
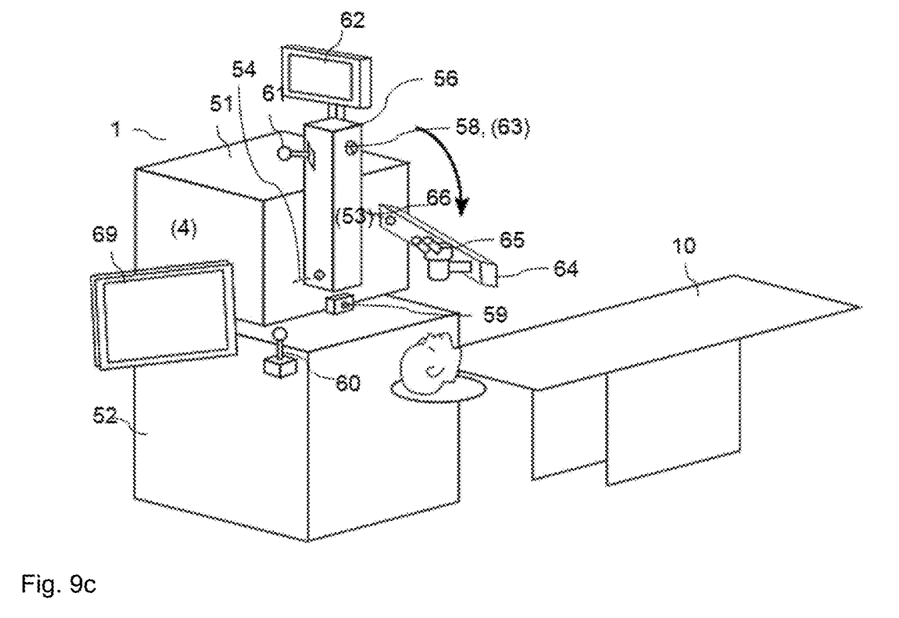

FIGS. 9a to 9c illustrate an example embodiment of the treatment apparatus 1 in more detail.

Here, the treatment apparatus 1 has a laser pivot arm 53 that is enclosed by a pivot arm housing 56 and an additional examination pivot arm 64 with a surgical microscope 55, with the first axis 54 of the laser pivot arm 53 and the second axis 56 of the examination pivot arm 64 on a device head 51 having an appropriate arrangement in relation to one another, and a therapy screen 62 movably fastened to the pivot arm housing 56 is coupled to the movement of the pivot arm housing 56 and also a surgical microscope 65 movably fastened to the examination pivot arm 64 is coupled to the movement of the examination pivot arm 64 in such a way that the therapy screen 62 and the surgical microscope 65 are always maintained in a non-tilted manner.

A treatment apparatus 1 as shown in this example embodiment can be used very well for a SMILE method, for example, but also for other methods for correcting the visual acuity of an eye or for cataract operations.

Here, FIG. 9a shows a standby mode of this treatment apparatus 1, in which the pivot arms 53, 64 are in a rest position, i.e., "parked" pivoted upward on the device head 51 in a space-saving manner, and in which, for example, a patient can be appropriately placed and positioned on the patient bed 10.

By contrast, FIG. 9b illustrates a laser therapy mode, i.e., the mode in which the laser pivot arm 53 was brought into a work position. By contrast, the examination pivot arm 64 is still in a rest position.

Finally, FIG. 9c shows an examination mode of the example embodiment of the treatment apparatus 1 using a surgical microscope 65. Here, the examination pivot arm 64 has been brought into a work position while the laser pivot arm 53 and its pivot arm housing 56 are in a rest position. The details should now be specified below.

The example-embodiment of the treatment apparatus 1 is composed of a device base 52 and a device head 51 that is adjustable on this device base 52 in terms of its height above a ground plane, i.e., the z-direction, and in terms of its position in the plane, i.e., in the x- and y-directions. The device head 51 contains a first part of the laser therapy optical unit required for performing the laser therapy. In the example embodiment, the device head 51 also contains the laser source, in this case a femtosecond laser source, required to produce a corresponding pulsed laser beam.

The second part of the laser therapy optical unit is rotatably mounted about a horizontal first axis 54 in a laser pivot arm 53. The laser pivot arm 53 can be pivoted about this first axis 54 from a rest position, in which it projects upward in approximately perpendicular fashion, into a work position, in which it is arranged approximately horizontally on the device head 51, i.e., approximately parallel to the ground plane, and back again.

The laser pivot arm 53 with its second laser therapy optical unit and the laser exit aperture 58 is surrounded by a housing, the pivot arm housing 56, in such a way that the pivot arm housing 56 leaves an opening for the laser exit aperture 58. This pivot arm housing 56 is mounted separately to the laser pivot arm 53 in coaxial fashion.

Initially, the pivot arm housing 56 pivots by an angle of approximately 90° together with the laser pivot arm 53 between an approximately perpendicular rest position or standby position and a horizontal work position. The movement is restricted by stops.

Overall, the laser pivot arm 53 can be moved by a greater angle than the pivot arm housing 56. Hence, the laser exit aperture 58, on which a contact glass or patient interface for coupling the laser pivot arm 53 to the eye of the patient to be treated can be affixed in a detachable manner, can be positioned protruding out of the pivot arm housing 56 to a greater or lesser extent, or else it can be retracted completely into the pivot arm housing 56.

The laser exit aperture 58 is retracted into the pivot arm housing 56, both in the rest position of the laser pivot arm 53 and when pivoting the laser pivot arm 53 and its pivot arm housing 56 from a rest position into a work position and from the work position into a rest position. Hence, the laser pivot arm 53 is in a slightly tilted position in comparison with its pivot arm housing 56.

Once the pivot arm housing 56 has arrived in a work position, i.e., is in the horizontal, the laser pivot arm 53 is released downward and slightly pivoted further such that it, too, reaches an approximately horizontal position and the laser exit aperture 58 emerges from the pivot arm housing 56. Here, the laser pivot arm 53 itself moves smoothly. The treatment apparatus is in the laser therapy mode in the approximately horizontal work position of both pivot arm housing 56 and laser pivot arm 53.

The therapy screen 62 is movably fastened to the pivot arm housing 56. In this case, the therapy screen 62, at the same time, is also the screen of a video microscope 63, showing the view of the laser exit aperture 58 onto the eye 2 to be treated. The video image of this video microscope 63, which is displayed on the therapy screen 62, is used by the surgeon, for example for the approach to, and the affixment of a contact glass 45 or another patient interface on, the eye 2 to be treated and for the observation of the laser cuts being carried out.

As shown further in FIGS. 9a to 9c, a camera 59 can be used to pre-position the device head 51. Said camera is fastened to the device head 51 and therefore has a fixed spatial relation to the position of the device head 51. The position is selected in such a way that a largely parallax-free view of the work volume of a therapy laser beam is effectuated, in particular of the possible position of its focus as a work point of a therapy objective in the laser therapy optical unit.

A graphics that is overlaid on the image of the camera 59 on the therapy screen 62 and/or else on the planning screen 69 of the planning device 16 already shows in the standby mode, i.e., in the rest position of the laser pivot arm 53, the expected position of the laser pivot arm 53 in its then pivoted-down work position. With the aid of this image, the surgeon can pre-position the device head 51 in such a way that the laser pivot arm 53 after pivoting-down into its work position, i.e., in the laser mode, is in an ideal position for the treatment start in respect of an approximate positioning, and only fine positioning in respect of structures of the eye 2 is still necessary.

Furthermore, a joystick 61 for controlling the coupling process to the patient is attached to the pivot arm housing 56. In the work position, the joystick 61, the laser exit aperture 58 of the laser therapy optical unit and the video image of the eye are aligned along a vertical line in order to facilitate an equally ergonomic operation for right-handed and left-handed users.

Now, a typical course of treatment using an above-described treatment apparatus 1, as can be used, for example, for a SMILE treatment or as part of a SMILE treatment, is described below:

First, the treatment or therapy parameters are planned on a planning screen 69 of the planning device 16, which is likewise arranged directly on the treatment apparatus 1 in this example-embodiment. However, alternatively, the planning screen 69 may also be spatially separated from the treatment apparatus 1. When planning, the treatment apparatus 1 is or example in a standby position, that is to say the laser pivot arm 53 and optionally the examination pivot arm 64, too, are pivoted up vertically in the rest position on the system.

The patient is positioned on the patient bed 10. This is possible with some comfort on account of the pivoted-up laser pivot arm 53.

Then, the surgeon positions the height of the device head 51 by operation of a joystick 60 on this device head 51, by use of which the translational movement of the device head 51 over the device base 52 can be controlled. In the process, orientation is provided by the image supplied by the camera 59, said image, including an overlaid symbol of a pivoted-down laser pivot arm 53, being visible on the therapy screen 62 and/or on the planning screen 69. As an alternative to the joystick, the positioning can also be effectuated in other embodiments by inputs on one of the two screens 62, 69 or by way of pushbuttons on the treatment apparatus 1.

The surgeon triggers the motor-driven pivoting-down of the laser pivot arm 53 in, and together with, its pivot arm housing 56; a corresponding pushbutton employed to this end is not illustrated in the figures. As a result of the pre-positioning and the still retracted laser exit aperture 58 of the laser pivot arm, a clear space remains between the laser exit aperture 58 and the patient's eye 2, said clear space expediently having a size of between 50 mm and 150 mm.

Now, a contact glass 45 is placed on the laser exit aperture 58, if this has not yet happened in the rest position of the laser pivot arm 53. The contact glass is held against the laser exit aperture 58 by application of negative pressure. Activation and deactivation of the hold by application of negative pressure is carried out in this case by virtue of pressing the contact glass against the laser exit aperture 58; in the process, the latter is still slightly moved in its retracted position and the switching process is triggered. This is advantageous over previously conventional laser therapy systems: There, the hold of the contact glass is switched separately. Consequently, the contact glass may fall down when it is detached. By contrast, in the solution described here, the surgeon or operator always holds sway over the contact glass during the switching process.

Then, the surgeon initiates the release of the movement of the laser pivot arm 53 within the pivot arm housing 56 by use of a joystick rotation of the joystick 61 on the pivot arm housing 56, or alternatively by use of a separate pushbutton (not illustrated). An automatic trigger of the movement by way of the applied contact glass is also possible in other embodiments. The laser exit aperture 58 with the contact glass moves toward the eye in the process. Here, the travel is approximately 50 mm, a range for this travel that is very generally expedient is from 30 mm to 100 mm. Hence, a safe distance from the eye, which is approximately 30 mm or, very generally, expediently assumes a value of between 10 mm and 100 mm, still remains.

Finally there is the docking phase, that is to say the phase in which the contact glass 45 is affixed: Here, the surgeon steers the contact glass 45 toward the eye 2 of the patient using the joystick 61 under observation by application of the video microscope 63. Fixating the eye by suctioning the eye to the contact glass 45 is triggered by a button on the joystick 61 once the correct position has been reached. In one configuration, it is possible to assist the correct positioning or centering of the contact glass or another patient interface on the eye by virtue of processing the video microscope image and using the latter to control the device head 51.

Hence, it is now finally possible by operation of a foot switch, which is not illustrated here, to start the actual laser therapy step by activating the laser beam, which is guided through the laser therapy optical units and the laser exit aperture 58 and focused in the patient's eye 2.

After completing this laser therapy step, the suctioning of the eye 45 by application of negative pressure is released by virtue of the pressure being increased here again, the laser pivot arm 53, and hence also the laser exit aperture 58, are pivoted back into the pivot arm housing 56 again and the device head 51 is slightly raised by a displacement in the z-direction. Hence, a safe distance from the eye is present once again. If need be, docking could be carried out once again from this position.

However, as a rule, this is not required. The contact glass 45 or the patient interface can be removed from the laser exit aperture 58, with the release being effectuated by brief upward pressure.

Now, the laser pivot arm 53 is pivoted up again together with its pivot arm housing 56; the clear space above the patient is re-established. Now, it is possible to perform further work steps or the patient can leave their position on the patient bed 10. The pivoting-up of the laser pivot arm 53 with its pivot arm housing 6 is initiated electronically, by pushing a button in this case. Alternatively, the laser pivot arm 53 with its pivot arm housing 56 can be pushed manually until this is recognized by a position sensor on the pivot arm housing; following this, a motor takes over the movement.

However, if both eyes of a patient are to be treated, the device head 51 can be moved by a translational movement in the x- and/or y-direction over the device base 52 prior to pivoting-up of the laser pivot arm 53 with its pivot arm housing 56 into its rest position such that the laser pivot arm 53 with its pivot arm housing 56 is positioned over the other eye. A treatment of the second eye can then be effectuated in the same way by virtue of a new contact glass 45 or patient interface being secured on the laser exit aperture 58 by application of negative pressure, and all steps following this are carried out as described above. Furthermore, an examination pivot arm 64 containing an examination device, in this case a surgical microscope 65, is also fastened in a pivotable manner about a second axis 66 on the device head 51 in this example embodiment of a treatment apparatus 1 according to the invention. By way of example, such a surgical microscope is required, or at least suggested, for the second main work step of the "SMILE" treatment. In the present example embodiment, the surgical microscope 65 contains a camera for recording the video and a slit projector for extended observation options in addition to the necessary illumination.

The pivot axis of the examination pivot arm 64, i.e., the second axis 66, is positioned at a particularly expedient location in space. This allows bringing the surgical microscope 65 on the examination pivot arm 64 from its rest position in which the examination pivot arm 64 is likewise pivoted up—either in a likewise perpendicular position or in an oblique position—to its work position using only one pivot movement.

This work position is also defined by a restriction of the rotational movement of the examination pivot arm 64 by presence of a stop. Here, it has a special property of coinciding with the work position of the laser pivot arm 53 with its second laser therapy optical unit and its laser exit aperture 58 and hence this avoids a change in position of the patient during the treatment.

If such an examination pivot arm 64 with a surgical microscope 65 is present, it is possible to perform the complete SMILE treatment using the treatment apparatus 1. To this end, after pivoting up the laser pivot arm 53 with its pivot arm housing 56 into its rest position after completing the actual laser therapy step, as described here, the treatment is continued as follows:

The surgeon initiates the motor-driven downward pivoting of the examination pivot arm 64 by pressing a button. The motor moves the examination pivot arm 64 into its work position, where it rests on a stop. The work position is determined by expedient selection of the relative position of the two pivot axes, that is to say the first axis 54 and the second axis 66, and the end position of the examination pivot arm 64 that is determined by the stop is determined in such a way that the eye to be treated further lies in the examination volume of the surgical microscope 65 directly after pivoting down the examination pivot arm 64.

Minor corrections, to the extent that these are necessary, are possible by adjusting the position of the device head 51 in relation to the device base 52 by making of translational movements. Serving to this end is the joystick 60 present on the device base 52, a separate foot console or a joystick present on the surgical microscope 65.

Once the examination pivot arm 64 with the surgical microscope 65 has been positioned accordingly, the lenticule extraction is carried out by the surgeon.

After completing the lenticule extraction, the examination pivot arm 64 with the surgical microscope 65 is pivoted up in a motor-driven manner and consequently pivoted back into its rest position. This can be initiated by pressing a button or else—as already described above for the pivot arm housing 56 and the laser pivot arm 53—by pushing. Hence, the clear space over the patient is re-established.

In this example embodiment, the planning screen according to FIG. 7 may be displayed on the screen 69 of the planning device 16, the treatment screen according to FIG. 8 can be displayed, alternately or together, on the planning screen 69 and/or on the therapy screen 62, or can be introduced in or overlaid on the image of the video microscope 63.

With this solution, the surgeon (physician) can verify the desired rotation of the cut pattern immediately before the treatment is triggered and can intervene in corrective fashion if necessary, should the rotation set not meet their expectations.

Additionally, the physician can use a plurality of anatomical features (e.g., iris and retina) when defining the planned rotation.

The display of the video microscope and of the treatment screen according to FIG. 8 can also be implemented with the aid of a head up display.

When entering the rotation, use is for example made of the coordinate system used by the diagnostic device, but there generally is a transformation into the coordinate system of the treatment apparatus during the subsequent calculation of the cut geometries.

Advantageously, an example rotation may also be proposed from the diagnostic data by using an algorithm, wherein the physician may also choose between various algorithms. In an extension, provision could also be made for the physician to be able to configure these algorithms in order to adapt them to their needs or experience. The scope of the invention also includes such an algorithm considering the treatment data of earlier treatments.

It should also be observed that the treatment apparatus 1 or the planning device 16 naturally specifically realizes the performance of the method explained in general terms above.

A further embodiment of the planning device exists in the form of a computer program or corresponding data medium with a computer program which realizes the planning device on a corresponding computer such that the input of the measurement data is implemented by suitable data transfer structures to the computer and the control data are transferred from this computer to the controller 11, for the purposes of which, once again, data transfer structures known to a person skilled in the art come into question.

While the invention has been presented in detail in the drawings and the description above, the illustration and description should be considered illustrative or exemplary in nature and not restrictive. It is understood that changes and modifications can be undertaken within the scope of the following claims by a person skilled in the art. In particular, the present invention comprises further embodiments with any combination of features of embodiments described above or below

The invention claimed is:

1. A planning device for generating control data for a treatment apparatus for eye surgery, said treatment apparatus producing at least one cut surface in a cornea by application of a laser device, the planning device comprising:
    a calculation application that defines the at least one corneal cut surface based on an image of the cornea recorded before the cornea is brought into contact with a contact glass of the treatment apparatus;
    the calculation application defining the at least one corneal cut surface and generating a control data record that controls the laser device to make the at least one corneal cut surface;
    wherein the calculation application determines the at least one corneal cut surface to facilitate a rotation of the at least one corneal cut surface about an axis running substantially parallel to a selected ocular axis; and
    wherein a time between changing a setting of a rotation angle and establishing treatment readiness or an initiation of a treatment is less than three seconds.

2. The planning device as claimed in claim 1, further comprising an input interface for an envisaged rotation of the cut surfaces.

3. The planning device as claimed in claim 1, wherein the rotation is defined in relation to anatomical features of the eye selected from a group consisting of the iris and retina.

4. A treatment apparatus for eye surgery, comprising:
    a laser device which by application of laser radiation generates at least one cut surface in the cornea according to control data; and
    a planning device as claimed in claim 1 that is configured to generate the control data, wherein the planning device determines the at least one corneal cut surface to facilitate the rotation of the at least one corneal cut surface about the axis running substantially parallel to the selected ocular axis.

5. The treatment apparatus as claimed in claim 4, wherein the planning device is configured such that the change in the rotation of the at least one corneal cut surface is undertaken before the initiation of the treatment.

6. A method of generating control data for a treatment apparatus for eye surgery which generates at least one corneal cut surface in the cornea by application of a laser device, the method comprising:
    providing corneal data;
    defining the at least one corneal cut surface;
    generating a control data record for the at least one corneal cut surface that controls the laser device based on an image of the cornea recorded before the cornea is brought into contact with a contact glass of the treatment apparatus; and
    determining the at least one corneal cut surface to facilitate a rotation of the at least one cut surface about an axis running substantially parallel to a selected ocular axis; and
    wherein a time between changing a setting of a rotation angle and establishing treatment readiness or an initiation of a treatment is less than three seconds.

7. The method as claimed in claim 6, wherein the providing of the corneal data, includes providing the corneal data on a basis of data of a refraction correction.

8. The method as claimed in claim 6, further comprising undertaking a change in the rotation of the at least one cut surface.

9. A method for eye surgery, at least one corneal cut surface in the cornea being produced, comprising:
    providing corneal data;
    defining the at least one corneal cut surface on a basis of the corneal data based on an image of the cornea recorded before the cornea is brought into contact with a contact glass of the treatment apparatus; and
    generating a control data record for the at least one corneal cut surface;
    transferring the control data to the treatment apparatus; and
    producing the at least one corneal cut surface by controlling the laser device using the control data record; and
    determining the at least one corneal cut surface to facilitate a rotation of the at least one cut surface about an axis running substantially parallel to a selected ocular axis; and
    wherein a time between changing a setting of a rotation angle and establishing treatment readiness or an initiation of a treatment is less than three seconds.

10. The method as claimed in claim 9, further comprising providing the corneal data on a basis of data of a refraction correction.

11. The method as claimed in claim 9, further comprising defining the at least one corneal cut surface to include a lenticule cut and a cap cut.

12. The method as claimed in claim 9, wherein a change in the rotation of the cut surfaces is undertaken before the start of the treatment.

13. A non-transitory computer readable medium that is not a carrier wave or signal with program code which, upon execution on a computer, carries out the method as claimed in claim 6.

14. The non-transitory computer readable medium that is not a carrier wave or signal with program code as claimed in claim 13, which, upon execution on a computer further includes providing the corneal data on a basis of data of a refraction correction; or further includes undertaking a change in the rotation of the cut surfaces.

15. A non-transitory computer readable medium that is not a carrier wave or signal with program code which, upon execution on a computer, carries out the method as claimed in claim 9.

16. The non-transitory computer readable medium that is not a carrier wave or signal with program code as claimed in claim 15, which, upon execution on a computer further includes providing corneal data, on a basis of data of a refraction correction.

17. The non-transitory computer readable medium that is not a carrier wave or signal with program code as claimed in claim 15, which, upon execution on a computer further includes defining the at least one corneal cut surface, to comprise a lenticule cut and a cap cut.

18. The non-transitory computer readable medium that is not a carrier wave or signal with program code as claimed in claim 15, which, upon execution on a computer further includes undertaking a change in the rotation of the cut surfaces.

* * * * *